United States Patent
Donovan

[11] Patent Number: 5,794,385
[45] Date of Patent: Aug. 18, 1998

[54] PORTABLE COLLAPSIBLE SHELF

[76] Inventor: Michael P. Donovan, 5053 S. 36th Ave., Omaha, Nebr. 68107

[21] Appl. No.: 722,557

[22] Filed: Sep. 27, 1996

[51] Int. Cl.$^6$ .................................................. E04F 19/00
[52] U.S. Cl. ...................... 52/36.4; 248/240; 49/70; 108/134
[58] Field of Search ........................ 52/364, 204.1; 248/240, 240.4, 291.1; 49/70; 108/134, 135

[56] References Cited

U.S. PATENT DOCUMENTS

| | | | |
|---|---|---|---|
| 1,852,723 | 4/1932 | Orton et al. | 248/240.4 X |
| 2,001,364 | 5/1935 | Larsson | 108/134 |
| 2,042,517 | 6/1936 | Ellis | 108/135 |
| 2,205,193 | 6/1940 | Goldman | 108/135 |
| 2,441,037 | 5/1948 | Sherri | 248/291.1 |
| 3,364,885 | 1/1968 | Brothers | 108/134 |

*Primary Examiner*—Carl D. Friedman
*Assistant Examiner*—Creighton Smith
*Attorney, Agent, or Firm*—Zarley,McKee,Thomte Voorhees & Sease; Mark D. Frederiksen

[57] ABSTRACT

A portable, collapsible shelf includes a generally rectangular frame with a panel extending across the frame to support a cat or the like. A pair of clips are snapped on to one of the frame members to permit pivotal movement of the frame within the clips. The clips are mounted on a storm door, immediately below a window. A pair of chains are mounted to the door jamb, with lower ends of the chains removably connected to the shelf, to thereby selectively retain the shelf in a horizontal position. The chains may be disconnected from the shelf to permit the shelf to pivot downwardly to a vertical storage position.

7 Claims, 3 Drawing Sheets

5,794,385

PORTABLE COLLAPSIBLE SHELF

TECHNICAL FIELD

The present invention relates generally to shelves, and more particularly to an improved shelf which may be collapsed to a storage position and may be easily moved to other locations.

BACKGROUND OF THE INVENTION

One of the favorite locations for cats to sit is in a window to view activities outside of the house. However, unless the particular window has a shelf or seat constructed with the window, other seating arrangements must be created by the homeowner.

A preferred location for seating for cats is in front of the storm door and one of the entrances to a home. However, placement of a chair, box or other object in front of the door for a cat to sit upon can be a major obstacle when it is desired to actually utilize the door to enter or exit the building. Other types of shelves which may be attached to a window include hooks which will connect to the windowsill and a pair of legs to prop the shelf up in a horizontal position, the legs typically abutting the wall under the window. While such shelves may work well with double hung windows, and other permanent windows in a home, they cannot be attached to the storm door of an entryway. In addition, even if such shelves were capable of attachment to a storm door, the primary door could not be closed with such a shelf in place. Thus, the shell must be removed prior to shutting the front door.

SUMMARY OF THE INVENTION

It is therefore a general object of the present invention to provide an improved portable, collapsible shelf.

Another object is to provide an improved shelf which may be easily and quickly transformed from a horizontal shelf, to a vertical storage position.

A further object of the present invention is to provide an improved shelf which may be easily removed and transported to other locations.

Yet a further object is to provide a portable and collapsible shelf which may be easily installed on a storm door.

These and other objects will be apparent to those skilled in the art.

The portable, collapsible shelf of the present invention includes a generally rectangular frame with a panel extending across the frame to support a cat or the like. A pair of clips are snapped on to one of the frame members to permit pivotal movement of the frame within the clips. The clips are mounted on a storm door, immediately below a window. A pair of chains are mounted to the door jamb, with lower ends of the chains removably connected to the shelf, to thereby selectively retain the shelf in a horizontal position. The chains may be disconnected from the shelf to permit the shelf to pivot downwardly to a vertical storage position.

DESCRIPTION OF THE PREFERRED EMBODIMENTS

Figure 1:
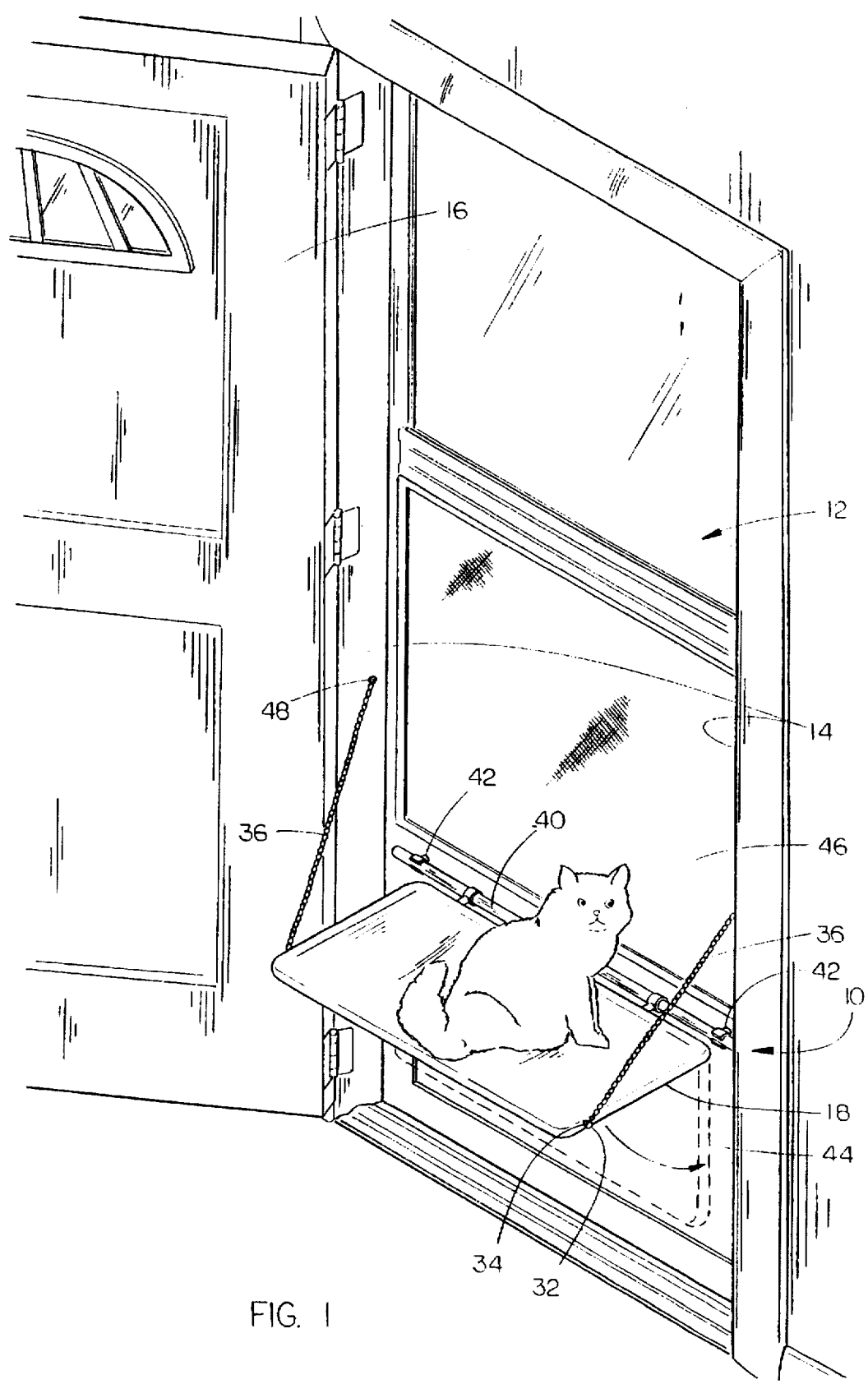
FIG. 1 is a pictorial view of the shelf of the present invention mounted between a storm door and primary door in a home.

Referring now to the drawings, in which similar or corresponding parts are identified with the same reference numeral and more particularly to FIG. 1, the shelf of the present invention is designated generally at 10 and is shown connected to a storm door 12 and door jam 14 exteriorly of a primary exterior door 16.

Figure 2:
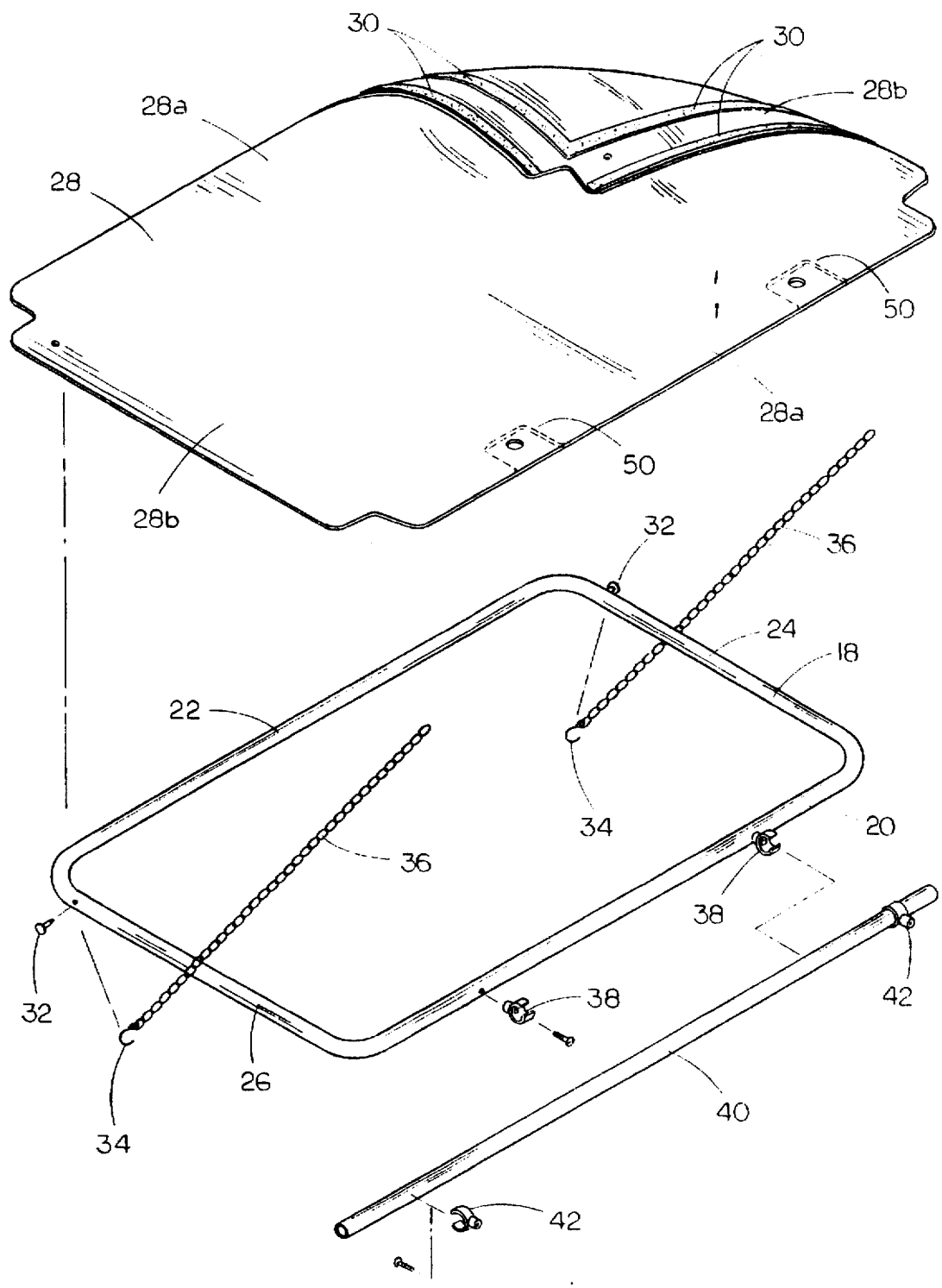
FIG. 2 is an exploded perspective view of the shelf of the present invention.

Referring now to FIG. 2, shelf 10 includes a rectangular tubular frame 18 having forward and rearward tubes 20 and 22, and opposing side tubes 24 and 26. Frame 18 supports a panel 28 of fabric or other material. The transverse and longitudinal edges of the underside of panel 28 have hook and loop fasteners 30 thereon to removably secure panel 28 to rigid frame 18.

A pair of pins 32 are mounted on the rearward ends of side tubes 24 and 26, and project horizontally outwardly. A pair of hooks 34 mounted on the lower ends of chains 36 will selectively hook on pins 32 to support the frame 18 in a horizontal position, as shown in FIG. 1.

A pair of C-shaped clips 38 are attached to forward tube 20 in spaced apart forwardly projecting orientation. Clips 38 are formed of a resilient material which will permit rod 40 to be selectively snapped into clips 38. A second pair of clips 42 are snapped onto rod 40, and are formed of a resilient material permitting selective removal of rod 40 therefrom. As shown in FIG. 1, clips 42 are mounted to a solid panel 44 directly below a window 46 in storm door 12, and align horizontally so as to retain rod 40 in a horizontal position. Clips 42 and clips 38 on rod 40 permit pivotal movement of frame 18 about rod. Screws 48 retain the upper end of chains 36 affixed to door jams 14.

Figure 3:
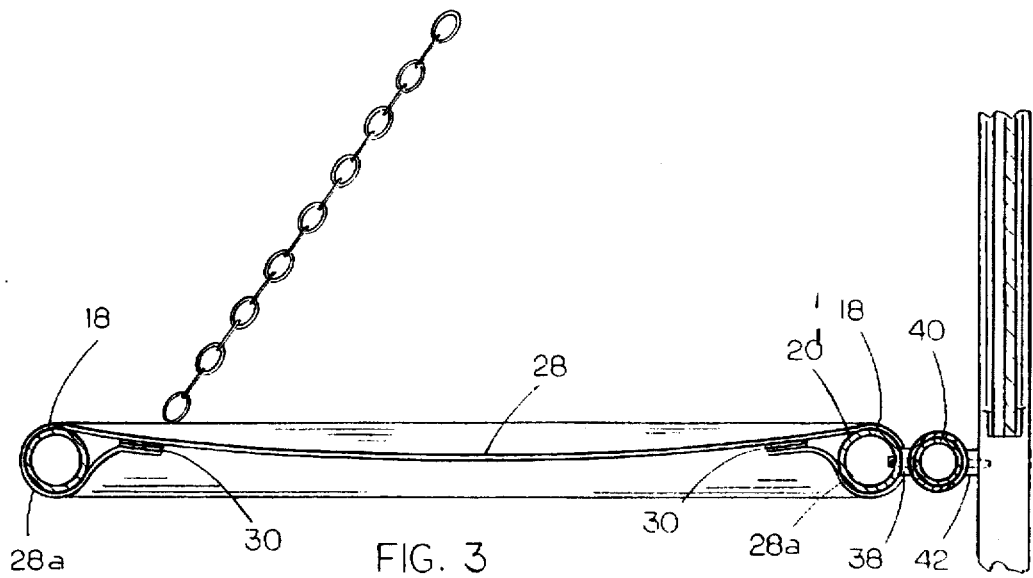
FIG. 3 is a sectional view taken at lines 3—3 in FIG. 2.

In use, clips 42 are first fastened to storm door 12 in horizontal alignment proximal the lower edge of the storm door window 46. Rod 40 is then snapped into position in clips 42. Panel 28 is fastened on to frame 18 by wrapping the longitudinal flaps 28a and end flaps 28b around the tubes of frame 18 such that the strips of hook and loop fastener connect to each other, as shown in FIGS. 2 and 3. Clips 38 on forward tube 20 are then snapped on to rod 40 so that frame 18 may pivot about rod 40.

Screws 48 are located at a height above rod 40 so that chain 36 will support frame 18 in a horizontal position when attached to pins 32. The simple connecting and disconnecting of hooks 34 with pins 32 permits frame 18 to be positioned either horizontally to support a cat, or vertically (as shown in hidden lines in FIG. 1) for storage.

Referring once again to FIG. 2, it should be noted that the use of clips 38 and rod 40 is only necessary when the forward tube 20 of frame 18 is not exposed. Cutouts 50 are shown in broken line along one of longitudinal flaps 28a of panel 28. These cutouts would permit clips 42 to directly grip forward tube 20 of frame 18, thereby eliminating the need for rod 40 or clips 38.

Figure 4:
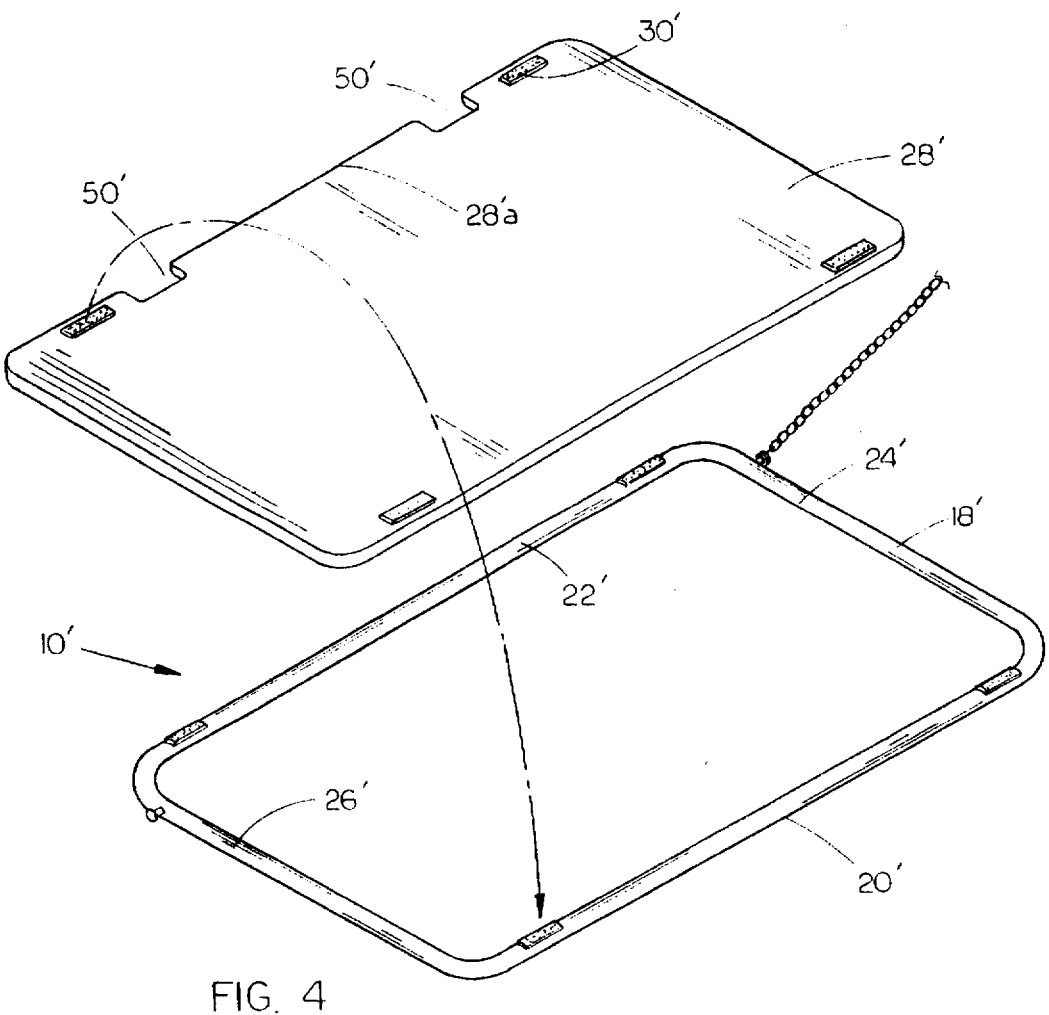
FIG. 4 is an exploded perspective view of a second embodiment of the invention.

Referring now to FIG. 4, a second embodiment of the shelf is designated generally at 10' and includes the same frame 18' with forward and rearward tubes 20' and 22' and side tubes 24' and 26'. In the second embodiment of the invention, shelf 10' includes a rigid panel 28' which may be secured to frame 18' using short hook and loop fastener strips 30' on the lower surface of panel 28' and the upper surfaces of the tubes of 18'. Cutouts 50' in the forward edge 28'a of panel 28 permit the clips 42 on storm door 12 (see FIG. 1) to directly clip to forward tube 20'. The use of a rigid panel 28' permits plants and other objects to be supported on shelf 10'.

Whereas the invention has been shown and described in connection with the preferred embodiment thereof, many modifications, substitutions and additions may be made which are within the intended broad scope of the appended claims.

I claim:

1. In combination:

a primary exterior door mounted in a door frame having opposing vertical jamb faces;

a storm door mounted exteriorly of the primary door, the storm door having a windovw therein with a solid panel located below the window;

a shelf pivotally connected to the storm door allowing pivotal movement between a first position projecting generally horizontally rearwardly from the storm door, and a second position hanging generally vertically adjacent the storm door; and a support selectively connected to the shelf allowing selective support of the shelf in the first position.

2. The combination of claim 1, wherein said support includes at least one cable having a first end connected to the door jamb spaced vertically above the shelf;

wherein the shelf includes forward and rearward edges and opposing side edges, the shelf being pivotally connected on a horizontal axis parallel and proximal the shelf forward edge; and wherein the cable has a second end removably connected to a shelf side edge proximal the rear edge.

3. The combination of claim 2, further comprising a pair of clips mounted on the storm door solid panel proximal a lower horizontal edge of the storm door window, said shelf forward edge pivotally and removably connected to said clips.

4. The combination of claim 3, wherein said shelf includes:

a frame comprising opposing forward and rearward members and opposing side members; and a panel attached to an extending across the frame from the forward to the rearward member and from one side member to the opposing side member.

5. The combination of claim 4, wherein said clips are generally C-shaped, wherein the frame forward member is generally cylindrical snap fit within the clips allowing pivotal movement about a longitudinal axis of the forward member.

6. The combination of claim 5, wherein said shelf panel is formed of fabric and is removably attached to the frame forward, rearward and side members.

7. The combination of claim 5, wherein said shelf panel is formed of a rigid material and is removably connected to said frame.

* * * * *